Z. BOSWORTH.

Domestic Oven.

No. 522. Reissued Jan. 19, 1858.

Section

N. PETERS, Photo-Lithographer, Washington, D. C.

UNITED STATES PATENT OFFICE.

ZEPHANIAH BOSWORTH, OF HARMAR, OHIO, ASSIGNOR TO JAMES M. McKINLAY.

IMPROVEMENT IN AIR-TIGHT STOVES.

Specification forming part of Letters Patent No. 2,538, dated April 6, 1842; extended seven years; Reissue No. 522, dated January 19, 1858.

*To all whom it may concern:*

Be it known that I, ZEPHANIAH BOSWORTH, of Harmar, in the county of Washington and State of Ohio, have invented certain Improvements in Stoves, for which Letters Patent were granted to me on the 6th day of April, A. D. 1842, which Letters Patent were duly extended according to law on the 31st day of March, 1856, for a term of seven years from the 6th day of April, 1856, which Letters Patent thus extended, and also the whole original invention, have been duly assigned to JAMES M. McKINLAY by proper instruments in writing, recorded according to statute in the United States Patent Office, in liber B[4], page 140, in transfer of patents; and, whereas, it has become known to me that said Letters Patent are inoperative on account of a defective description and specification, said defects having occurred through inadvertence, as by my affidavits forwarded to the Patent Office does more fully appear; now, be it known that I do hereby declare that the following is an amended and full, clear, and exact description of my invention, reference being had to the accompanying drawings, which make part of this description, in which—

Figure 1:
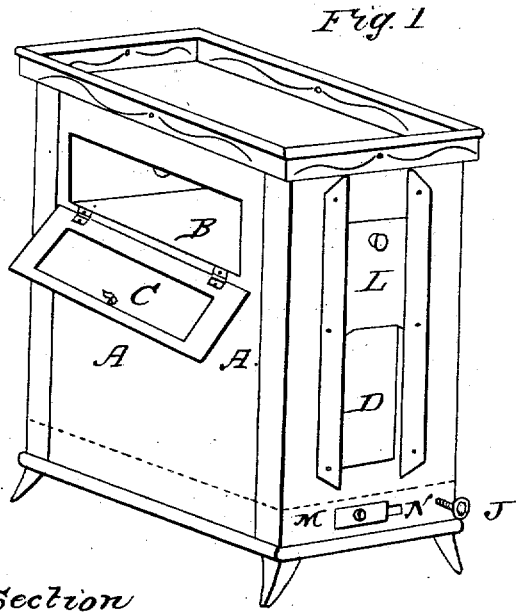
Figure 2:
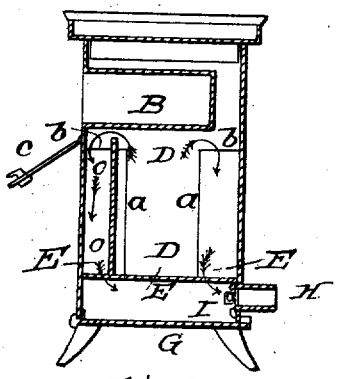
Figure 3:
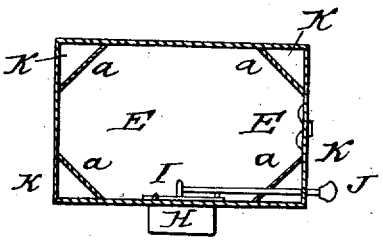

Figure 1 is a perspective view of a stove. Fig. 2 is a vertical section thereof from front to back through its center; and Fig. 3 is a view of the false bottom, hereinafter described.

Prior to the date of my invention a stove had been invented and patented in the United States in the year 1834, by one James Atwater, which had a fire pot or chamber, a space above the same intended for a combustion-chamber, but too small to effect the object, and descending flues outside of the stove proper, being, in fact, separate pipes taking their origin in the combustion-chamber, near its top, and finally conveying the products of the combustion into a chimney. This same stove was also provided with a properly-governed aperture leading into the chimney below the fire-pot, by means of which a downward draft of air through the fire itself might be produced when the descending pipes were closed by a damper. This patent describes this aperture as planned for that purpose, and it never seems to have entered his mind that it might also have been usefully employed in combination with the diving-flues for regulating the draft through them. It would not, however, effect this object perfectly, as the current of cold air entering the lower part of the chimney must, under his arrangement, pass through the ash-pit, so part thereof might pass up through the fuel, while that which went into the chimney would carry with it ashes and dust, thereby clogging the flue unnecessarily. This stove was deficient in several particulars: first, in that above stated—viz., that the draft into the lower part of the chimney passed through the ash-pit; second, in that the chamber for the combustion of gases was entirely too small, so that they had no time to mingle and consume perfectly; third, in that the gases passed from the combustion-chamber at its upper part, the current therefore, being direct, prevented mingling of the gases, and did not permit the lighter gases to ascend and burn and then drop as they became heavier to the flue-entrances; fourthly, in that the stove was expensive in construction and necessitated the employment of numerous joints through which noxious gases might and would escape when the draft was checked; fifth, in that it occupied too much room. These deficiencies were therefore first in principle and second in method of construction, and the stove invented by me remedies these evils, while it retains all the good qualities of the Atwater stove.

In my stove the aperture for regulating the draft by admitting cold air into the lower part of the chimney has no connection with the ash-pit, nor can air pass from it through the fire; second, the chamber for the combustion of the gases is of ample size, affording space and time for the mingling and combustion of gases; third, the descending flues lead from the bottom of this chamber, so that there is no direct current through it, either fast or slow, to prevent mingling, and light gases can rise and burn and then descend and pass out again after perfect combustion; fourth, the stove is cheap, and has no more joints through which gas may escape than any box-stove, and, fifth, it requires little or no more space than such a stove fitted for burning the same amount of fuel. A stove combining these characteristics and in practice producing these results is shown in the drawings, and which I will proceed to describe by reference thereto.

A is the front plate of the stove, which, when not constructed with the addition of an oven, has no opening through it.

B is an oven having a drop-door, C. This oven projects into the combustion-chamber or body of the stove, having a free space around it, above, below, before, behind, and on one side, such space being the chamber in which the gaseous products of combustion and unconsumed oxygen mingle and burn.

D D is the fire-chamber, which contains the fuel.

E E is a false bottom, the position of which is shown by dotted lines in Fig. 1.

F is an open space between the plate E and the bottom of the stove G, and H is the exit or entrance into a pipe or chimney. A close-fitting damper, I, is connected to this opening, which may be operated by the handle J. The false bottom E E has its four corners taken off so as to leave four openings through it, one at each corner, as shown at K K, Fig. 3. Descending passages for the escape of the products of combustion are formed by four upright plates, *a a a a*, which rise as high as *b b*, and their edges lie in contact with the sides of the stove. They form descending or diving flues, through which there is a free communication from the bottom of the space or combustion-chamber, in which the gases mingle and burn, to the space F under the false bottom.

L is a sliding door, opening into the fire-chamber, for the supply of fuel and the admission of air to the same. This door should be made to fit very closely.

M is a slide or door, covering the hole N, which leads into the space F. Through this opening a portion of air may be admitted when it is desired to lessen the draft, and consequently the amount of fuel to be consumed. Any desired quantity of air may thus pass direct to the pipe H, without entering the ash-pit or fire-pot.

O O represent a portion of a partition of grate-bars, extending from end to end of the fire-chamber, near the front, and which are designed to prevent the direct contact of the burning fuel with the outer plate. There may be similar grate-bars towards the back end, if desired; but as the combustion within the stove can be regulated with the utmost facility by means of the door, and the aperture which allows the air to pass directly into the pipe, and the damper, the overheating of the external plates may be controlled independently of a provision of this kind.

Now, a careful consideration of the drawings, in connection with this description, will show that this stove attains all the ends proposed, and further, it may be proved that the regulation of the combustion by opening a direct passage to the chimney is important when contrasted with regulation by a damper in the pipe, first, as a means of ventilating the apartment at all times; second, as a preventive against the escape of noxious gases, and, thirdly, as a means of lessening the frequency and violence of the explosions to which air-tight stoves are subject.

What I claim in this stove as new and of my own invention is—

1. A fire-pot, a combustion-chamber, and descending flues leading from the bottom thereof and between the fire pot and outer casing to a chimney, all arranged in the interior of a box inclosure or casing of suitable materials, with proper provision for admission of air or fuel, all substantially such as are described, in combination with a properly-governed aperture for admitting air into the chimney without passing through the fire, substantially in the manner set forth herein, the whole constituting a stove substantially such as is herein specified, and this combination is claimed whether the oven be used or not.

2. The sliding door L, the drop-door C, and the other parts of this stove do not differ from such as have been previously known and used; no claim is therefore made to them, or in fact to any part of the stove taken individually, but the claims are limited to the combination substantially as above set forth and made known.

In testimony whereof I have hereunto subscribed, in the village of Harmer, on this 12th day of June, 1857.

ZEPHANIAH BOSWORTH.

Witnesses:

ALFRED D. EVANS,
PLATT SMITH,
ASA SOULE,
B. A. MARSH.